(12) United States Patent
Rarick

(10) Patent No.: US 7,689,642 B1
(45) Date of Patent: Mar. 30, 2010

(54) EFFICIENT ACCURACY CHECK FOR NEWTON-RAPHSON DIVIDE AND SQUARE-ROOT OPERATIONS

(75) Inventor: Leonard D. Rarick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1182 days.

(21) Appl. No.: 11/266,838

(22) Filed: Nov. 3, 2005

(51) Int. Cl.
G06F 7/52 (2006.01)

(52) U.S. Cl. ....................... 708/650; 708/605

(58) Field of Classification Search .......... 708/605, 708/650
See application file for complete search history.

(56) References Cited

U.S. PATENT DOCUMENTS 6,163,791 A * 12/2000 Schmookler et al. ........ 708/605
6,341,300 B1 * 1/2002 Shankar et al. ............. 708/605
2004/0128338 A1 * 7/2004 Even et al. .................. 708/650

* cited by examiner

*Primary Examiner*—Tan V Mai
(74) *Attorney, Agent, or Firm*—Park, Vaughan & Fleming LLP

(57) ABSTRACT

One embodiment of the present invention provides a system that efficiently performs an accuracy-check computation for Newton-Raphson divide and square-root operations. During operation, the system performs Newton-Raphson iterations followed by a multiply for the divide or square-root operation. This result is then rounded to produce a proposed result. Next, the system performs an accuracy-check computation to determine whether rounding the result to a desired precision produces the correct result. This accuracy-check computation involves performing a single pass through a multiply-add pipeline to perform a multiply-add operation. During this single pass, a Booth encoding of an operand in a multiply portion of the multiply-add pipeline is modified, if necessary, to cause an additional term for the accuracy-check computation to be added to the result of the multiply-add operation. In this way, the accuracy-check computation can be completed without requiring an additional pass through the multiply-add pipeline and without an additional partial-product row in the multiply-add pipeline.

24 Claims, 2 Drawing Sheets

EFFICIENT ACCURACY CHECK FOR NEWTON-RAPHSON DIVIDE AND SQUARE-ROOT OPERATIONS

BACKGROUND

1. Field of the Invention

The present invention relates to circuits that perform arithmetic operations. More specifically, the present invention relates to a method and an apparatus that efficiently performs an accuracy-check computation for Newton-Raphson divide and square-root operations.

2. Related Art

Several techniques can be used to perform divide, r/s, and square-root, $\sqrt{s}$, operations. One popular technique is to use the Newton (sometimes called the Newton-Raphson) method. As typically implemented for the division operation, the Newton-Raphson method first finds an approximation to a zero of the function $$f(x) = 1 - \frac{1}{sx}$$

for the reciprocal of the denominator, 1/s, in the division operation. Similarly, for the square-root operation, the Newton-Raphson method first finds an approximation to a zero of the function $$f(x) = 1 - \frac{1}{sx^2}$$

for the reciprocal of the square root, $1/\sqrt{s}$.

The Newton-Raphson method starts with an initial estimate, a, of the zero to the function. Better estimates are obtained by iterating using the formula $$a_{next} = a - \frac{f(a)}{f'(a)}$$

This computation can be accomplished with only the following operations: add, subtract, multiply, and, divide-by-two (for square root, which can be accomplished with a shift). To simplify the method, the denominator, s, (for divide) is normalized to be between one half and one, and the value, s, (to find the square root of) is normalized to be between one fourth and one. Thus, the zero of the function (for both cases) is between one and two. A property of the Newton-Raphson method that may be maintained when used with these functions is that, independent of the initial estimate a, all succeeding estimates are less than the zero of the function.

Sufficient Newton-Raphson iterations are carried out to obtain the desired internal accuracy. Then a multiplication is performed. For divide, the result of the Newton-Raphson iterations is multiplied by the numerator, r, to obtain an internal result, m. For square root, the result of the Newton-Raphson iterations is multiplied by s (because $s*1/\sqrt{s}=\sqrt{s}$) to obtain an internal result m. In both cases, m is an approximation to the exact result, e. Also, the internal result, m, needs to have more accuracy than the accuracy of the final result for the method described below. Furthermore, we ensure that m is less than the exact result. The internal result, m, is also called the "result of the Newton-Raphson method".

The result of the Newton-Raphson method contains only a finite amount of accuracy. Thus, it is not exact. The desired result is the exact result rounded according to one of the following three rounding modes: (1) round towards zero (truncate), (2) round towards infinity (round up), or (2) round to nearest (if exactly half way between representable results, round to "even" to make the least-significant bit (LSB) zero).

The internal estimate, m, is rounded to produce a rounded result, t, which functions as a proposed answer. However, no matter how much extra accuracy has been achieved, the extra accuracy is finite, so the value of t may not be the same as the rounded exact result. For example, consider FIG. 1 which illustrates a segment of the real number line, with vertical lines representing values that can be represented with the finite external accuracy. Note that in the expression t+1, the +1 represents 1 added to the LSB of t (with external accuracy).

The internal value, m, is the current (best obtained) estimate. The example in FIG. 1 is for rounding towards zero (down), so that m is truncated to t. However, the exact result is the value e. This means that no matter how much accuracy is obtained in computing, m, it is always possible that a representable value (in FIG. 1, the value is t+1) is between m and e. In order to produce the correct result, this situation must be evaluated and t must be replaced with t+1 if appropriate.

The system performs an "accuracy-check" computation to determine whether t must be replaced with t+1. Each combination of a rounding mode and an operation requires a different formula to be evaluated to make this determination. (The derivations of these formulae are discussed in following sections of this application.) There are three rounding modes, round down, round to nearest, and round up) and two operations (divide (r/s) and square root $\sqrt{s}$). Thus, to make determinations for all combinations of the three possible rounding modes and the two possible operations, the following six formulae need to be computed.

In the following, a pair of equations is given when a modification is needed. The left side shows the computation as perceived without any modification to the Booth encoding. The right side shows the computation as perceived with the modification to the Booth encoding, the modification being to add ½, 1, or 2 to t. (Booth encoding is explained in a later section.)

| | |
|---|---|
| 1. divide round down | $z = (t * s) - r + s = ((t + 1) * s) - r$ |
| 2. divide round nearest | $z = (t * s) - r + s/2 = ((t + (1/2)) * s) - r$ |
| 3. divide round up | $z = (t * s) - r$ |
| 4. square root round down | $z = (t * t) - s + 2t + 1 = ((t + 2) * t) - s + 1$ |
| 5. square-root round nearest | $z = (t * t) - s + t + ¼ = ((t + 1) * t) - s + ¼$ |
| 6. square-root round up | $z = (t * t) - s$ |

In all cases, if z<0, then t+1 is the correct answer. If z>0, then t is the correct answer. The case where z=0 is discussed below.

If a multiply-add pipeline is available, as is often the case, the system can easily compute (t*s)−r or (t*t)−s in one pass through the multiply-add pipeline. Thus, the third and sixth formulae may be computed in one pass through the multiply-add pipeline. For the remaining four cases, after the multiply-add computation, one can make an additional pass through the pipeline to add the additional term. (Note that 2t+1 and t+¼ are considered to be single terms).

It is also possible to take another approach. Since we are concerned with the sign of z instead of its actual value (except when it is zero), the system can instead compare the result of the multiply-add to the additional term to see if the result is greater-than, equal-to, or less-than the additional term. This approach also involves another pass through the multiply-add pipeline, and is hence similar to doing the addition.

Another approach is to add an additional "partial-product row" to the carry-save adder portion of the multiply-add pipeline to add the additional term to the result. This produces the value of z directly without an additional pass through the multiply-add pipeline. Although this approach is more efficient in time, it requires additional hardware for the extra partial-product row.

Hence, what is needed is a method and an apparatus for performing an accuracy-check computation for Newton-Raphson division and square-root operations without requiring an additional pass through the multiply-add pipeline, and without requiring an additional partial-product row in the carry-save adder portion of the multiply-add pipeline.

SUMMARY

One embodiment of the present invention provides a system that efficiently performs an accuracy-check computation for Newton-Raphson divide and square-root operations. During operation, the system performs Newton-Raphson iterations followed by a multiply for the divide or square-root operation. This result is then rounded to produce a proposed result. Next, the system performs an accuracy-check computation to determine whether rounding the proposed result to the desired precision produces the correct result. This accuracy-check computation involves performing a single pass through a multiply-add pipeline to perform a multiply-add operation. During this single pass, a Booth encoding of an operand in a multiply portion of the multiply-add pipeline is modified, if necessary, to cause an additional term for the accuracy-check computation to be added to the result of the multiply-add operation. In this way, the accuracy-check computation can be completed without requiring an additional pass through the multiply-add pipeline and without an additional partial-product row in the multiply-add pipeline.

In a variation on this embodiment, if the accuracy-check computation indicates that the result is not correct, the system produces the correct result by adding one to the LSB of the result.

In a variation on this embodiment, if the Newton-Raphson operation divides r by s to produce a result that is rounded down, performing the accuracy-check computation involves truncating the extra-precision result of the Newton-Raphson method to produce a value t with the desired precision. It then involves computing $(t^*s)-r+s=(t+1)^*s-r$ by using the multiply-add pipeline to compute $(t+1)^*s-r$ by modifying the Booth encoding of an operand in the multiply portion of the multiply-add pipeline of what otherwise would have been the computation of $(t^*s)-r$.

In a variation on this embodiment, if the Newton-Raphson operation divides r by s to produce a result that is rounded to the nearest representable value, performing the accuracy-check computation involves rounding the extra-precision result of the Newton-Raphson method to produce a value t with the desired precision. It then involves computing $(t^*s)-r+s/2=(t+\frac{1}{2})^*s-r$ by using the multiply-add pipeline to compute $(t+\frac{1}{2})^*s-r$ by modifying the Booth encoding of an operand in the multiply portion of the multiply-add pipeline of what otherwise would have been the computation of $(t^*s)-r$.

In a variation on this embodiment, if the Newton-Raphson operation divides r by s to produce a result that is rounded up, performing the accuracy-check computation involves rounding up the extra-precision result of the Newton-Raphson method to produce a value t with the desired precision. It then involves computing $(t^*s)-r$ using the multiply-add pipeline. (No modification of the Booth encoding of any operand is required for this case.)

In a variation on this embodiment, if the Newton-Raphson operation computes a square-root of a radicand s to produce a result that is rounded down, performing the accuracy-check computation involves truncating the extra-precision result of the Newton-Raphson method to produce a value t with the desired precision. It then involves computing $(t^*t)-s+2t+1=(t+2)^*t-s+1$ by using the multiply-add pipeline to compute $(t+2)^*t-s$ by modifying the Booth encoding of an operand in the multiply portion of the multiply-add pipeline of what otherwise would have been the computation of $(t^*t)-s$ and also modifying at least one input to a carry-save adder in the pipeline to add an additional 1 to the result.

In a variation on this embodiment, if the Newton-Raphson operation computes a square-root of a radicand s to produce a result that is rounded to the nearest representable value, performing the accuracy-check computation involves rounding the extra-precision result of the Newton-Raphson method to produce a value t with the desired precision. It then involves computing $(t^*t)-s+t+\frac{1}{4}=(t+1)^*t-s+\frac{1}{4}$ by using the multiply-add pipeline to compute $(t+1)^*t-s$ by modifying the Booth encoding of an operand in the multiply portion of the multiply-add pipeline of what otherwise would have been the computation of $(t^*t)-s$ and also modifying at least one input to a carry-save adder in the pipeline to add an additional $\frac{1}{4}$ to the result.

In a variation on this embodiment, if the Newton-Raphson operation computes a square-root of a radicand s to produce a result that is rounded up, performing the accuracy-check computation involves rounding up the extra-precision result of the Newton-Raphson method to produce a value t with the desired precision. It then involves computing $(t^*t)-s$ using the multiply-add pipeline. (No modification of the Booth encoding of any operand is required for this case.)

Table 1 presents Booth encodings in accordance with an embodiment of the present invention.

Table 2 illustrates Booth groupings in accordance with an embodiment of the present invention.

Table 3 illustrates four situations where the LSB of the multiplier is the LSB of a bit pair in accordance with an embodiment of the present invention.

Table 4 illustrates two situations where the LSB of the multiplier is the most-significant bit (MSB) of a bit pair in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
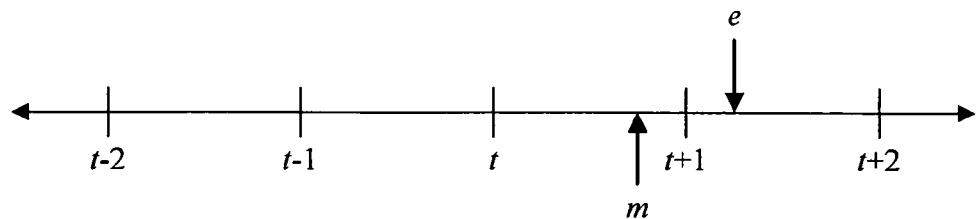
FIG. 1 illustrates a rounding operation.
Figure 2:
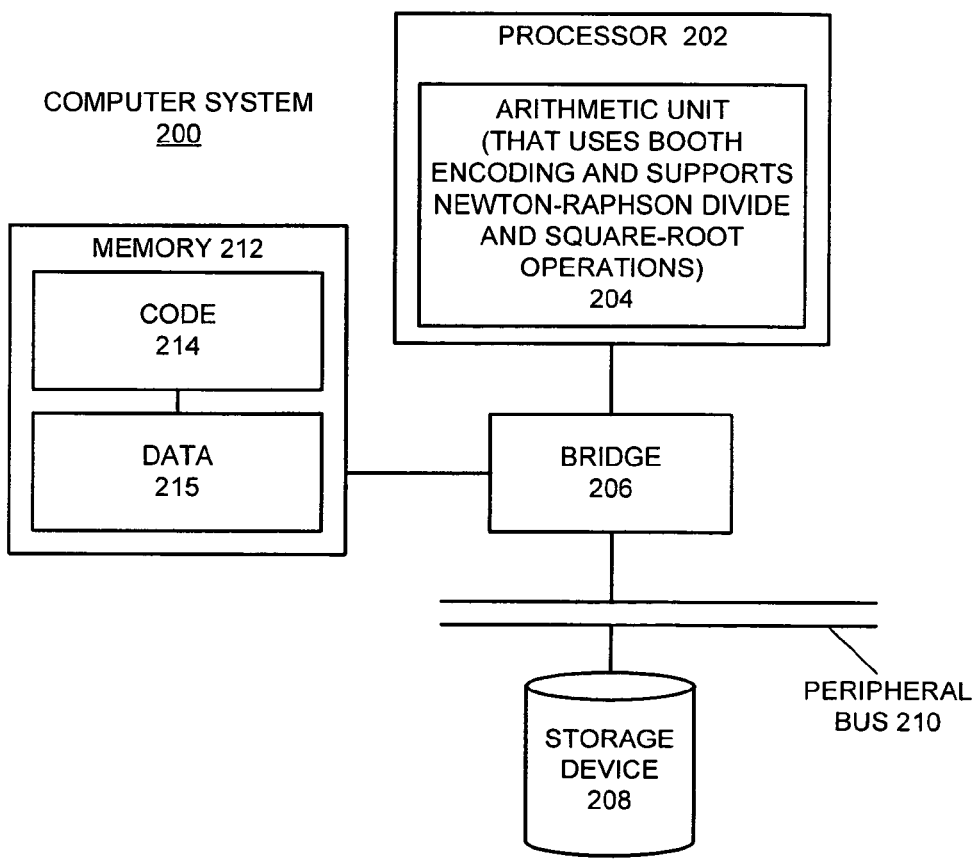
FIG. 2 illustrates a computer system in accordance with an embodiment of the present invention.

FIG. 2 illustrates a computer system 200 in accordance with an embodiment of the present invention. As illustrated in FIG. 2, computer system 200 includes processor 202, which is coupled to a memory 212 and to a peripheral bus 210 through bridge 206. Bridge 206 can generally include any type of circuitry for coupling components of computer system 200 together.

Processor 202 can include any type of processor, including, but not limited to, a microprocessor, a mainframe computer, a digital signal processor, a personal organizer, a device controller and a computational engine within an appliance. Processor 202 contains an arithmetic unit 204, which uses Booth encoding and supports Newton-Raphson divide and square-root operations.

Processor 202 communicates with storage device 208 through bridge 206 and peripheral bus 210. Storage device 208 can include any type of non-volatile storage device that can be coupled to a computer system. This includes, but is not limited to, magnetic, optical, and magneto-optical storage devices, as well as storage devices based on flash memory and/or battery-backed up memory.

Processor 202 communicates with memory 212 through bridge 206. Memory 212 can include any type of memory that can store code and data for execution by processor 202. As illustrated in FIG. 2, memory 212 contains code 214 and data 215.

Note that although the present invention is described in the context of computer system 200 illustrated in FIG. 2, the present invention can generally operate on any type of computing device with an arithmetic unit that performs divide and/or square root operations. Hence, the present invention is not limited to the computer system 200 illustrated in FIG. 2.

Accuracy-Check Computations

In order to perform the accuracy-check computations we need to obtains a formula for each possible combination of rounding mode (round-up, round-to-nearest, round-down) and operation (divide, square-root). The six formulae listed above for accuracy-check computations are derived as follows.

For divide rounding down, the exact solution is $r/s = t+1+v$, which is rounded to $t+1$ if $v \geq 0$. The obtained solution is $t+1-w$, which was rounded to t. To determine whether rounding to t is correct, we need to determine the sign of v. To do so, we compute $(t*s)-r+s=z$. Note that,

| $(t * s) - r + s$ | = | $(t + 1) * s - r$ |
| | = | $((r/s) - v)*s - r$ |
| | = | $r - v * s - r$ |
| | = | $-v * s$ |
| | = | $z$ |

Hence, if $z \leq 0$, then t is the wrong answer and needs to be replaced with $t+1$.

For divide rounding to nearest, the exact solution is $r/s = t + \frac{1}{2} + v$, which is rounded to $t+1$ if $v \geq 0$ or if $v=0$ and the LSB of the rounded result would otherwise have been 1. The obtained solution is $t+\frac{1}{2}-w$, which was rounded to t. To determine whether rounding to t is correct, we need to determine the sign of v. To do so, we compute $(t*s)-r+s/2=z$. Note that,

| $(t * s) - r + s/2$ | = | $(t + 1/2) * s - r$ |
| | = | $((r/s) - v) * s - r$ |
| | = | $r - v * s - r$ |
| | = | $-v * s$ |
| | = | $z$ |

Hence, if $z<0$, then t is the wrong answer and needs to be replaced with $t+1$. Also note that if $z=0$, then if the last bit of t is one, the answer is wrong and needs to be replaced with $t+1$.

For divide rounding up, the exact solution is $r/s=t+v$, which is rounded to $t+1$ if $v>0$. The obtained solution is $t-w$, which was rounded to t. To determine whether rounding to t is correct, we need to determine the sign of v. To do so, we compute $(t*s)-r=z$. Note that,

| $(t * s) - r$ | = | $((r/s) - v) * s - r$ |
| | = | $r - v * s - r$ |
| | = | $-v * s$ |
| | = | $z$ |

Hence, if $z<0$, then t is the wrong answer and needs to be replaced with $t+1$.

For square-root rounding down, the exact solution is $S=(t+1+v)^2$, which is rounded to $t+1$ if $v \geq 0$. The obtained solution is $(t+1-w)^2$, which was rounded to t. To determine whether rounding to t is correct, we need to determine the sign of v. To do so, we compute $(t*t)-s+2t+1=z$. Note that,

| $(t * t) - s + 2t + 1$ | = | $(t + 2) * t - s + 1$ |
| | = | $(t + 1)^2 - s$ |
| | = | $(t + 1 + v - v)^2 s$ |
| | = | $(t +1 +v)^2 - 2v * (t + 1 + v) + v^2 - s$ |
| | = | $s - 2v * (t + 1 + v) + v^2 - s$ |
| | = | $-v * (2t + 2 + 2v - v)$ |
| | = | $-v(2t + 2 + v)$ |

Since v is smaller than t, $2t+2+v$ is always positive, so the sign of v may be determined from the sign of z. If $z \leq 0$, then t is the wrong answer and needs to be replace with $t+1$.

For square-root rounding to nearest, the exact solution is $s=(t+\frac{1}{2}+v)^2$, which is rounded to $t+1$ if $v>0$. The obtained solution is $(t+\frac{1}{2}-w)^2$, which was rounded to t. To determine whether rounding to t is correct, we need to determine the sign of v. To do so, we compute $(t*t)-s+t+\frac{1}{4}=z$. Note that,

| $(t * t) - s + t + \frac{1}{4}$ | = | $(t + 1) * t - s + \frac{1}{4}$ |
| | = | $(t + (\frac{1}{2}))^2 - s$ |
| | = | $(t + (\frac{1}{2}) + v - v)^2 - s$ |
| | = | $(t + (\frac{1}{2}) + v)^2 - 2v * (t + (\frac{1}{2}) + v) + v^2 - s$ |
| | = | $s - 2v * (t + (\frac{1}{2}) + v) + v^2 - s$ |
| | = | $-v * (2t + 1 + 2v - v)$ |
| | = | $-v(2t + 1 + v)$ |
| | = | $z$ |

Since v is smaller than t, $2t+1+v$ is always positive, so the sign of v may be determined from the sign of z. If $z<0$, then t is the wrong answer and needs to be replace with $t+1$. Note that z is never equal to zero.

For square-root rounding up, the exact solution is $s=(t+v)^2$, which is rounded to $t+1$ if $v>0$. The obtained solution is $(t-w)^2$, which was rounded to t. To determine whether rounding to t is correct, we need to determine the sign of v. To do so, we compute $(t*t)-s=z$. Note that, $$
\begin{aligned}
(t*t)-s &= ((t+v)-(v))^2 - s \\
&= (t+v)^2 - 2v(t+v) + v^2 - s \\
&= s - 2vt - 2v^2 + v^2 - s \\
&= -2vt - v^2 \\
&= -v(2t+v) \\
&= z
\end{aligned}
$$

Since v is smaller than t, 2t+v is always positive, so the sign of v may be determined from the sign of z. If z<0, then t is the wrong answer and needs to be replace with t+1.

Modifying Booth Encoding

To achieve a high level of computational performance, it is desirable to perform the accuracy-check computations efficiently. If the system has a multiply-add pipeline, as is often the case, then one can easily compute t*s−r or t*t−s in a single pass through the multiply-add pipeline. Thus, the third and sixth formulae listed above may be computed in one pass through the multiply-add pipeline. As mentioned above, in conventional systems the other four cases require an additional pass through the multiply-add pipeline, or an additional partial-product row in the multiply-add pipeline.

The present invention modifies the Booth encoding of an operand in the multiply portion of the multiply-add pipeline to obtain the value of z directly without further processing, and is thus efficient in time, and also without adding an extra partial-product row, and is thus efficient in hardware.

Booth encoding is a well-known method, which is often used to implement a multiply operation. In the most common form of this method, the multiplier is considered to be composed of pairs of bits. One would like each partial-product to be the multiplicand times two bits of the multiplier. However, this is not easily accomplished. If the two bits represent the value of 0, 1, or 2, such a partial-product may be easily and quickly obtained. But if both bits of the pair are one, representing the value of three, three times the multiplicand cannot be obtained easily or quickly. Thus, the second bit of each pair is given the value of −2 instead of +2. When evaluating each pair, the MSB of the previous pair is also used and is given the value of 1. This provides the correct result since +2=+4−2 and the value of −2 is used in the previous pair and the value of +1 is used in this pair. However, this pair has four times the value of the previous pair, and so 4 times +1 provides the needed +4 missing from the previous pair. A list of Booth encodings appears in Table 1.

TABLE 1

| this pair | MSB of previous | value |
|---|---|---|
| 00 | 0 | 0 + 0 + 0 = 0 |
| 01 | 0 | 0 + 1 + 0 = 1 |
| 10 | 0 | −2 + 0 + 0 = −2 |
| 11 | 0 | −2 + 1 + 0 = −1 |
| 00 | 1 | 0 + 0 + 1 = 1 |
| 01 | 1 | 0 + 1 + 1 = 2 |
| 10 | 1 | −2 + 0 + 1 = −1 |
| 11 | 1 | −2 + 1 + 1 = 0 |

Thus, the five possible values are 2, 1, 0, −1, and −2. All of these values may be obtained quickly and easily with shift and inversions of the multiplicand.

As an example, suppose the multiplier is:

0100010110100111000010 then groups of two and corresponding Booth groupings appear in Table 2.

TABLE 2

| 00 | 10 | 00 | 10 | 11 | 01 | 00 | 11 | 10 | 00 | 01 | 10 |
|---|---|---|---|---|---|---|---|---|---|---|---|
| /\|\| | /\|\| | /\|\| | /\|\| | /\|\| | /\|\| | /\|\| | /\|\| | /\|\| | /\|\| | /\|\| | /\|\| |
| 000 | 001 | 100 | 001 | 101 | 110 | 010 | 001 | 111 | 100 | 000 | 011 | 100 |
| 0 | 1 | −2 | 1 | −1 | −1 | 1 | 1 | 0 | −2 | 0 | 2 | −2 |

Note that the Booth groupings have extra zeros on the ends, and that every other bit is used twice. For each bit that is used twice, its value is always exactly the same in both places.

In order to be able to implement the expressions (t*s)−r+s/2 and (t*t)−s+t+0.25, we need the location of the LSB for the multiplier to not be in the least-significant position of the carry-save adder. This can be easily accommodated in the usual case, because divide and square root are usually implemented for floating-point numbers and the carry-save adder usually is implemented for both floating point and integer numbers, and integer numbers often need a larger carry-save adder than do floating point numbers.

The modifications to the multiplier will be considered in two parts. (1) One part is the adding of an extra multiple of the multiplicand (+s, +s/2, +2t, +t). (2) The other part is the adding a constant (+1, +¼).

We consider first the adding of an extra multiple of the multiplicand. This involves adding ½, 1, or 2 times the multiplicand. There are two cases to consider, (1) the LSB of the multiplier is in the LSB position of a Booth encoding pair, or (2) is in the MSB position of a Booth encoding pair. Both cases may need to be implemented because the LSB of the multiplier for double-precision is likely to be an odd number of bits from the LSB of the multiplier for single-precision.

TABLE 3

| | LSB BITS | | |
|---|---|---|---|
| Situation 1: | 00 00 | | |
| | /\|\|/\|\|/ | | |
| | 0 000 000 | to add 0 | * multiplicand (no change) |
| | 0 001 100 | to add ½ | * multiplicand |
| | 0 001 000 | to add 1 | * multiplicand |
| | 0 010 000 | to add 1 | * multiplicand |
| | 0 011 000 | to add 2 | * multiplicand |

TABLE 3-continued

|  |  | LSB BITS |  |  |
|---|---|---|---|---|
| Situation 2: |  | 01 00 |  |  |
|  |  | /ll /ll/ |  |  |
|  |  | 0 010 000 | to add 0 | * multiplicand (no change) |
|  |  | 0 011 100 | to add ½ | * multiplicand |
|  |  | 0 011 000 | to add 1 | * multiplicand |
|  |  | 1 101 000 | to add 2 | * multiplicand |
|  |  | 1 110 000 | to add 2 | * multiplicand |
| Situation 3: |  | 10 00 |  |  |
|  |  | /ll /ll / |  |  |
|  |  | 1 100 000 | to add 0 | * multiplicand (no change) |
|  |  | 1 101 100 | to add ½ | * multiplicand |
|  |  | 1 101 000 | to add 1 | * multiplicand |
|  |  | 1 110 000 | to add 1 | * multiplicand |
|  |  | 1 111 000 | to add 2 | * multiplicand |
| Situation 4: |  | 11 00 |  |  |
|  |  | /ll /ll / |  |  |
|  |  | 1 110 000 | to add 0 | * multiplicand (no change) |
|  |  | 1 111 100 | to add ½ | * multiplicand |
|  |  | 1 111 000 | to add 1 | * multiplicand |
|  |  | 1 001 000 | to add 2 | * multiplicand |
|  |  | 1 010 000 | to add 2 | * multiplicand |

LSB of Multiplier is the LSB of a Bit Pair

There are four situations to consider, depending on the value of the last two bits of the multiplier. These four situations are illustrated in Table 3. Note that when more than one way to achieve the desired result exists, a second bit combination is shown. Also note that unlike the usual Booth encoding, bit positions that normally would have the same value do not necessarily have the same value after modification for the extra multiple of the multiplicand.

LSB of Multiplier is the MSB of a Bit Pair

There are two more situations to consider, depending on the value of the last bit of the multiplier. These situations are illustrated in Table 4. Note that when more than one way to achieve the desired result exists, a second bit combination is shown. Also note that unlike the usual Booth encoding, the bit positions that normally would have the same value do not necessarily have the same value after modification for the extra multiple of the multiplicand.

TABLE 4

|  |  | LSB BITS |  |  |
|---|---|---|---|---|
| Situation 5: |  | 00 00 |  |  |
|  |  | /ll /ll / |  |  |
|  |  | 0 000 000 | to add 0 | * multiplicand (no change) |
|  |  | 0 001 000 | to add ½ | * multiplicand |
|  |  | 0 010 000 | to add ½ | * multiplicand |
|  |  | 1 100 000 | to add 1 | * multiplicand |
|  |  | 0 011 000 | to add 1 | * multiplicand |
|  |  | 1 000 000 | to add 2 | * multiplicand |
| Situation 6: |  | 10 00 |  |  |
|  |  | /ll /ll / |  |  |
|  |  | 1 100 000 | to add 0 | * multiplicand (no change) |
|  |  | 1 101 000 | to add ½ | * multiplicand |
|  |  | 1 110 000 | to add ½ | * multiplicand |
|  |  | 1 111 000 | to add 1 | * multiplicand |
|  |  | 1 000 000 | to add 1 | * multiplicand |
|  |  | 1 011 000 | to add 2 | * multiplicand |

Adding a Constant

Adding in a constant, either +1 or +¼, is not difficult. After the Booth encoding multiplexers, the carry-save adder (often called a Wallace tree) includes many full adders that reduce the number of partial-products to only two. Other functional blocks may also be used, such as half adders, 4-to-2 compressors, and 5-to-3 compressors. At the edges of the carry-save adder there are (or can be made to be) inputs to the adders or compressors that are set to zero. An extra +1 may be implemented by using one such input (that otherwise would be connected to ground) in the appropriate column.

Likewise, the +¼ may also be implemented two columns to the left of the column where the +1 is implemented. In order to get the correct functionality, the +1 must go in the correct column. However, this is not the case for the +¼. As long as the +¼ is in any column to the left of the column where the +1 is implemented, the correct decisions will be achieved (z<0 or z>0) since the bit for +¼ is not combined with any other bit. Thus, if instead of using +¼, the value of +½ or +⅛ or +1/16 etc. is used, the correct evaluation of the sign of z will occur. This may be useful if there is only one column to the left of the +1 position in the carry-save adder (in which case, +½ would be used,) or if the same bit were used for both single-precision and double-precision (in which case, the single-precision usage of the bit might be +$1/(2^{29})$ less than +¼, assuming +¼ is used for double-precision).

Flow Chart

Figure 3:
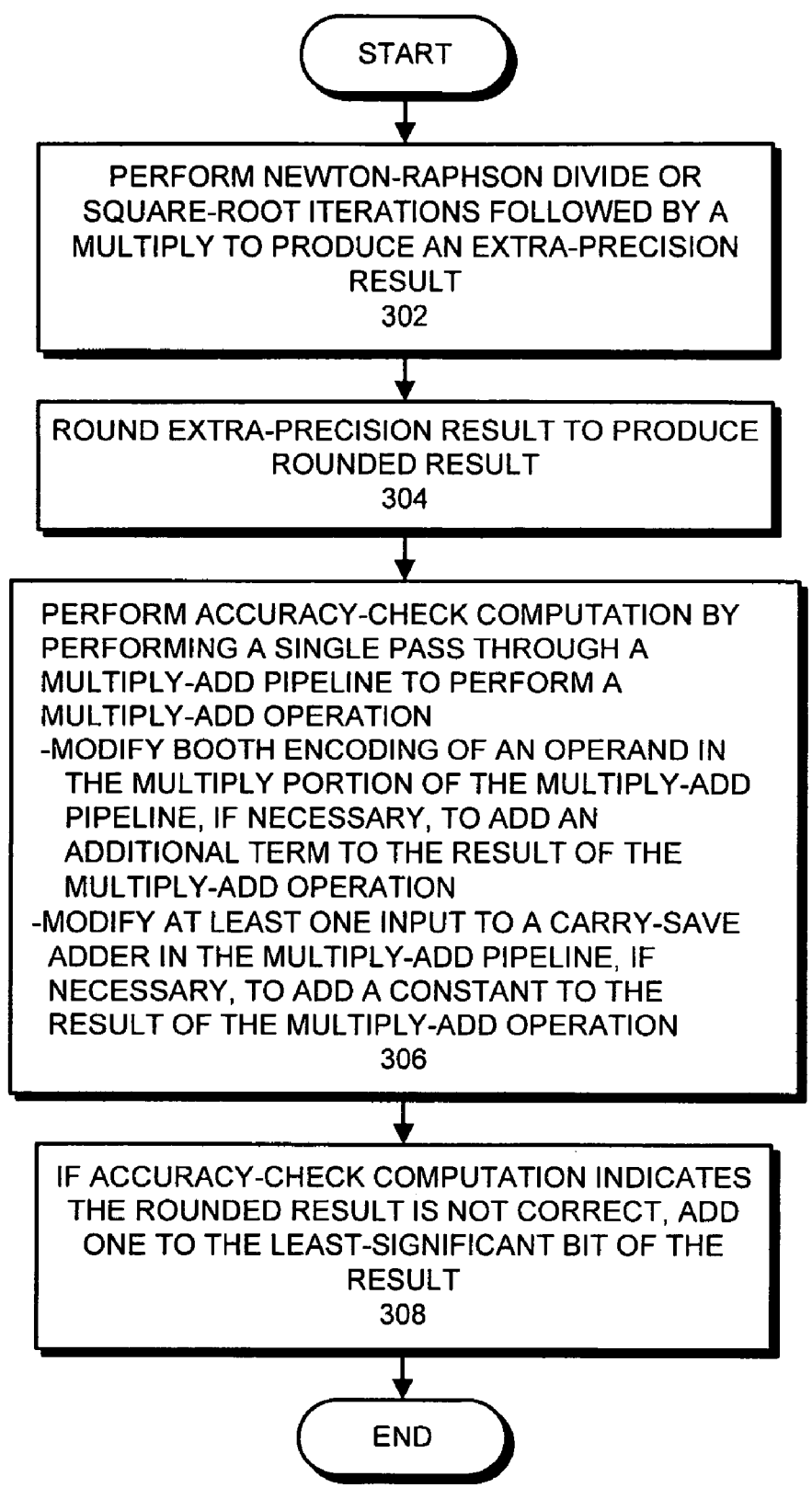
FIG. 3 presents a flow chart illustrating the process of rounding the result of a Newton-Raphson division or square-root operation in accordance with an embodiment of the present invention.

FIG. 3 presents a flow chart summarizing the process of rounding the result of a Newton-Raphson division or square-root operation in accordance with an embodiment of the present invention. During this process, the system performs Newton-Raphson divide or square-root iterations followed by a multiplication to produce an extra precision result m (step 302). Next, the system rounds this extra-precision result m to produce a rounded result t with the desired precision (step 304).

Next, the system performs an accuracy-check computation using one of the six above-described formulae (step 306). This accuracy-check computation involves performing a single pass through a multiply-add pipeline to perform a multiply-add operation (t*s−r, t*t−s). During this single pass, a Booth encoding of an operand in the multiply portion of the multiply-add pipeline is modified, if necessary, to cause an additional term (s, s/2, 2t, t) for the accuracy-check computation to be added to the result of the multiply-add operation. Also, if necessary, a constant (1, ¼) is added to the result by modifying at least one input to a carry-save adder in the multiply-add pipeline.

Finally, if the accuracy-check computation indicates that the result is not correct, the system produces the correct result by adding one to the LSB of the result (step 308).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for efficiently performing an accuracy-check computation for Newton-Raphson divide and square-root operations, wherein the method comprises:

in a computer system,
performing Newton-Raphson iterations followed by a multiply for a divide or square-root operation to produce a result; and performing the accuracy-check computation to determine whether rounding the result to a desired precision produces the correct result;

wherein the accuracy-check computation involves performing a single pass through a multiply-add pipeline to perform a multiply-add operation, and wherein during the single pass, a Booth encoding of an operand in a multiply portion of the multiply-add pipeline is modified, if necessary, to cause an additional term for the accuracy-check computation to be added to the result of the multiply-add operation;

whereby the accuracy-check computation is completed without requiring an additional pass through the multiply-add pipeline, and without an additional partial-product row in the multiply-add pipeline.

2. The computer-implemented method of claim 1, wherein if the accuracy-check computation indicates that the result is not correct, the method further comprises producing the correct result by adding one to the least-significant bit of the result.

3. The computer-implemented method of claim 1, wherein if the Newton-Raphson operation divides r by s to produce a result that is rounded down, performing the accuracy-check computation involves, truncating the extra-precision result of the Newton-Raphson method to produce a value t with the desired precision; and computing $(t*s)-r+s=(t+1)*s-r$ by using the multiply-add pipeline to compute $(t+1)*s-r$ by modifying the Booth encoding of an operand in the multiply portion of the multiply-add pipeline of what otherwise would have been the computation of $(t*s)-r$.

4. The computer-implemented method of claim 1, wherein if the Newton-Raphson computation divides r by s to produce a result that is rounded to the nearest representable value, performing the accuracy-check computation involves, rounding the extra-precision result of the Newton-Raphson method to produce a value t with the desired precision; and computing $(t*s)-r+s/2=(t+\frac{1}{2})*s-r$ by using the multiply-add pipeline to compute $(t+\frac{1}{2})*s-r$ by modifying the Booth encoding of an operand in the multiply portion of the multiply-add pipeline of what otherwise would have been the computation of $(t*s)-r$.

5. The computer-implemented method of claim 1, wherein if the Newton-Raphson operation divides r by s to produce a result that is rounded up, performing the accuracy-check computation involves, rounding up the extra-precision result of the Newton-Raphson method to produce a value t with the desired precision; and computing $(t*s)-r$ by using the multiply-add pipeline to compute $(t*s)-r$ without modifying the Booth encoding in the multiply-add pipeline.

6. The computer-implemented method of claim 1, wherein if the Newton-Raphson operation computes a square-root of a radicand s to produce a result that is rounded down, performing the accuracy-check computation involves, truncating the extra-precision result of the Newton-Raphson method to produce a value t with the desired precision; and computing $(t*t)-s+2t+1=(t+2)*t-s+1$ by using the multiply-add pipeline to compute $(t+2)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional 1 to the result.

7. The computer-implemented method of claim 1, wherein if the Newton-Raphson operation computes a square-root of a radicand s to produce a result that is rounded to the nearest representable value, performing the accuracy-check computation involves, rounding the extra-precision result of the Newton-Raphson method to produce a value t with the desired precision; and computing $(t*t)-s+t+\frac{1}{4}=(t+1)*t-s+\frac{1}{4}$ by using the multiply-add pipeline to compute $(t+1)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional ¼ to the result.

8. The computer-implemented method of claim 1, wherein if the Newton-Raphson operation computes a square-root of a radicand to produce a result that is rounded up, performing the accuracy-check computation involves, rounding up the extra-precision result of the Newton-Raphson method to produce a value t with the desired precision; and computing $(t*t)-s$ by using the multiply-add pipeline to compute $(t*t)-s$ without modifying the Booth encoding in the multiply-add pipeline and without adding an additional input to a carry-save adder in the multiply-add pipeline.

9. An apparatus which efficiently performs an accuracy-check computation for Newton-Raphson divide and square-root operations, wherein the apparatus comprises:

an arithmetic unit configured to perform Newton-Raphson iterations followed by a multiply for a divide or square-root operation to produce a result; and wherein the arithmetic unit is configured to perform the accuracy-check computation to determine whether rounding the result to a desired precision produces the correct result;

wherein during the accuracy-check computation, the arithmetic unit is configured to perform a single pass through a multiply-add pipeline to perform a multiply-add operation; and wherein during the single pass, a Booth encoding of an operand in a multiply portion of the multiply-add pipeline is modified, if necessary, to cause an additional term for the accuracy-check computation to be added to the result of the multiply-add operation;

whereby the accuracy-check computation is completed without requiring an additional pass through the multiply-add pipeline, and without an additional partial-product row in the multiply-add pipeline.

10. The apparatus of claim 9, wherein if the accuracy-check computation indicates that the result is not correct, the arithmetic unit is configured to produce the correct result by adding one to the least-significant bit of the result.

11. The apparatus of claim 9, wherein if the Newton-Raphson operation divides r by s to produce a result that is rounded down, while performing the accuracy-check computation, the arithmetic unit is configured to, truncate the extra-precision result of the Newton-Raphson method to produce a value t with the desired precision; and to compute $(t*s)-r+s=(t+1)*s-r$ by using the multiply-add pipeline to compute $(t+1)*s-r$ by modifying the Booth encoding of an operand in the multiply portion of the

13 multiply-add pipeline of what otherwise would have been the computation of $(t*s)-r$.

12. The apparatus of claim 9, wherein if the Newton-Raphson operation divides r by s to produce a result that is rounded to the nearest representable value, while performing the accuracy-check computation, the arithmetic unit is configured to,
round the extra-precision result of the Newton-Raphson method to produce a value t with the desired precision; and to
compute $(t*s)-r+s/2=(t+\frac{1}{2})*s-r$ by using the multiply-add pipeline to compute $(t+\frac{1}{2})*s-r$ by modifying the Booth encoding of an operand in the multiply portion of the multiply-add pipeline of what otherwise would have been the computation of $(t*s)-r$.

13. The apparatus of claim 9, wherein if the Newton-Raphson operation divides r by s to produce a result that is rounded up, while performing the accuracy-check computation, the arithmetic unit is configured to,
round up the extra-precision result of the Newton-Raphson method to produce a value t with the desired precision; and to
compute $(t*s)-r$ by using the multiply-add pipeline to compute $(t*s)-r$ without modifying the Booth encoding in the multiply-add pipeline.

14. The apparatus of claim 9, wherein if the Newton-Raphson operation computes a square-root of a radicand s to produce a result that is rounded down, while performing the accuracy-check computation, the arithmetic unit is configured to,
truncate the extra-precision result of the Newton-Raphson method to produce a value t with the desired precision; and to
compute $(t*t)-s+2t+1=(t+2)*t-s+1$ by using the multiply-add pipeline to compute $(t+2)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional 1 to the result.

15. The apparatus of claim 9, wherein if the Newton-Raphson operation computes a square-root of a radicand s to produce a result that is rounded to the nearest representable value, while performing the accuracy-check computation, the arithmetic unit is configured to,
round the extra-precision result of the Newton-Raphson method to produce a value t with the desired precision; and to
compute $(t*t)-s+t+\frac{1}{4}=(t+1)*t-s+\frac{1}{4}$ by using the multiply-add pipeline to compute $(t+1)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional $\frac{1}{4}$ to the result.

16. The apparatus of claim 9, wherein if the Newton-Raphson operation computes a square-root of a radicand s to produce a result that is rounded up, while performing the accuracy-check computation, the arithmetic unit is configured to,
round up the extra-precision result of the Newton-Raphson method to produce a value t with the desired precision; and to
compute $(t*t)-s$ by using the multiply-add pipeline to compute $(t*t)-s$ without modifying the Booth encoding in the multiply-add pipeline and without adding an additional input to a carry-save adder in the multiply-add pipeline.

14

17. A computer system with an arithmetic unit which efficiently performs an accuracy-check computation for Newton-Raphson divide and square-root operations, wherein the computer system comprises:
a processor;
a memory;
an arithmetic unit within the processor configured to perform Newton-Raphson iterations followed by a multiply for a divide or square-root operation to produce a result; and
wherein the arithmetic unit is configured to perform the accuracy-check computation to determine whether rounding the result to a desired precision produces the correct result;
wherein during the accuracy-check computation, the arithmetic unit is configured to perform a single pass through a multiply-add pipeline to perform a multiply-add operation; and
wherein during the single pass, a Booth encoding of an operand in a multiply portion of the multiply-add pipeline is modified, if necessary, to cause an additional term for the accuracy-check computation to be added to the result of the multiply-add operation;
whereby the accuracy-check computation is completed without requiring an additional pass through the multiply-add pipeline, and without an additional partial-product row in the multiply-add pipeline.

18. The computer system of claim 17, wherein if the accuracy-check computation indicates that the result is not correct, the arithmetic unit is configured to produce the correct result by adding one to the least-significant bit of the result.

19. The computer system of claim 17, wherein if the Newton-Raphson operation divides r by s to produce a result that is rounded down, while performing the accuracy-check computation, the arithmetic unit is configured to,
truncate the extra-precision result of the Newton-Raphson method to produce a value t with the desired precision; and to
compute $(t*s)-r+s=(t+1)*s-r$ by using the multiply-add pipeline to compute $(t+1)*s-r$ by modifying the Booth encoding of an operand in the multiply portion of the multiply-add pipeline of what otherwise would have been the computation of $(t*s)-r$.

20. The computer system of claim 17, wherein if the Newton-Raphson operation divides r by s to produce a result that is rounded to the nearest representable value, while performing the accuracy-check computation, the arithmetic unit is configured to,
round the extra-precision result of the Newton-Raphson method to produce a value t with the desired precision; and to
compute $(t*s)-r+s/2=(t+\frac{1}{2})*s-r$ by using the multiply-add pipeline to compute $(t+\frac{1}{2})*s-r$ by modifying the Booth encoding of an operand in the multiply portion of the multiply-add pipeline of what otherwise would have been the computation of $(t*s)-r$.

21. The computer system of claim 17, wherein if the Newton-Raphson operation divides r by s to produce a result that is rounded up, while performing the accuracy-check computation, the arithmetic unit is configured to,
round up the extra-precision result of the Newton-Raphson method to produce a value t with the desired precision; and to
compute $(t*s)-r$ by using the multiply-add pipeline to compute $(t*s)-r$ without modifying the Booth encoding in the multiply-add pipeline.

22. The computer system of claim 17, wherein if the Newton-Raphson operation computes a square-root of a radicand s to produce a result that is rounded down, while performing the accuracy-check computation, the arithmetic unit is configured to, truncate the extra-precision result of the Newton-Raphson method to produce a value t with the desired precision; and to compute $(t*t)-s+2t+1=(t+2)*t-s+1$ by using the multiply-add pipeline to compute $(t+2)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional 1 to the result.

23. The computer system of claim 17, wherein if the Newton-Raphson operation computes a square-root of a radicand s to produce a result that is rounded to the nearest representable value, while performing the accuracy-check computation, the arithmetic unit is configured to, round the extra-precision result of the Newton-Raphson method to produce a value t with the desired precision; and to compute $(t*t)-s+t+¼=(t+1)*t-s+¼$ by using the multiply-add pipeline to compute $(t+1)*t-s$ by modifying the Booth encoding of an operand in the multiply portion of the multiply-add pipeline of what otherwise would have been the computation of $(t*t)-s$ and also modifying at least one input to a carry-save adder in the pipeline to add an additional ¼ to the result.

24. The computer system of claim 17, wherein if the Newton-Raphson operation computes a square-root of a radicand s to produce a result that is rounded up, while performing the accuracy-check computation, the arithmetic unit is configured to, round up the extra-precision result of the Newton-Raphson method to produce a value t with the desired precision; and to compute $(t*t)-s$ by using the multiply-add pipeline to compute $(t*t)-s$ without modifying the Booth encoding in the multiply-add pipeline and without adding an additional input to a carry-save adder in the multiply-add pipeline.

* * * * *